US009828026B2

(12) United States Patent
Behrens

(10) Patent No.: US 9,828,026 B2
(45) Date of Patent: Nov. 28, 2017

(54) TRANSPORT TRAILER LOAD BALANCING SUSPENSION AND STEERING SYSTEMS

(71) Applicant: PREMIER COIL SOLUTIONS, INC., Waller, TX (US)

(72) Inventor: Randall Dean Behrens, Sealy, TX (US)

(73) Assignee: Premier Coil Solutions, Inc., Waller, TX (US)

(*) Notice: Subject to any disclaimer, the term of this patent is extended or adjusted under 35 U.S.C. 154(b) by 0 days.

(21) Appl. No.: 15/013,155

(22) Filed: Feb. 2, 2016

(65) Prior Publication Data

US 2017/0217490 A1 Aug. 3, 2017

(51) Int. Cl.
*B62D 13/02* (2006.01)
*B62D 15/02* (2006.01)
*B60G 13/18* (2006.01)
*B60G 13/14* (2006.01)
*B62D 5/26* (2006.01)

(52) U.S. Cl.
CPC ........... *B62D 13/025* (2013.01); *B60G 13/14* (2013.01); *B60G 13/18* (2013.01); *B62D 5/26* (2013.01); *B62D 15/02* (2013.01); *B60G 2202/242* (2013.01)

(58) Field of Classification Search
CPC ..... B60G 13/10; B60G 17/0155; B62D 13/04
See application file for complete search history.

(56) References Cited

U.S. PATENT DOCUMENTS

| 2,002,604 | A | * | 5/1935 | Johnson | B62D 13/00 280/420 |
| 2,818,275 | A | * | 12/1957 | Hollowell | B62D 13/00 180/433 |
| 2,940,769 | A | * | 6/1960 | Taylor | B64F 1/32 254/9 C |
| 3,114,426 | A | * | 12/1963 | Larsen | B60P 1/02 180/435 |
| 3,131,950 | A | * | 5/1964 | Weaver, Jr. | B62D 53/0864 280/43.2 |
| 3,386,747 | A | * | 6/1968 | Watt, Jr. | B62D 53/0864 280/35 |
| 4,335,901 | A | * | 6/1982 | Gladish | B60G 17/04 267/64.28 |
| 5,013,057 | A | * | 5/1991 | Vanninmaja | B62D 13/04 180/403 |
| 5,059,085 | A | * | 10/1991 | Koller | B60P 3/07 280/425.1 |
| 7,134,829 | B2 | * | 11/2006 | Quenzi | B60P 1/02 180/24.01 |

(Continued)

*Primary Examiner* — Kevin Hurley
(74) *Attorney, Agent, or Firm* — Lloyd L. Davis; Andrews Kurth Kenyon LLP

(57) ABSTRACT

A multi-axle transport trailer having a plurality of axles includes a suspension comprising air bags associated with each axle, the air bags in communication with an air source, wherein air bags associated with different axles are capable of having different air pressures therein. The trailer further optionally includes a steering system associated with at least one axle, the axle including a tie rod connected between wheels on both ends of the axle, the steering system comprising cylinders configured to articulate the wheels, and a sensing device configured to monitor movement of the tie rod and facilitate actuating the cylinders to turn the wheels.

6 Claims, 4 Drawing Sheets

(56) References Cited

U.S. PATENT DOCUMENTS

| | | | | |
|---|---|---|---|---|
| 7,950,675 B1* | 5/2011 | Quenzi | ................. | B60G 17/02 |
| | | | | 180/209 |
| 8,317,215 B2* | 11/2012 | Quenzi | .................... | B60P 3/06 |
| | | | | 280/425.1 |
| 8,419,032 B1* | 4/2013 | McGhie | ................. | B62D 13/04 |
| | | | | 280/100 |
| 9,051,007 B2* | 6/2015 | Orgeron | ................. | B62D 13/00 |
| 9,096,263 B2* | 8/2015 | Prem | .................... | B62D 13/005 |
| 9,545,866 B2* | 1/2017 | Woods, Sr. | ............. | B60P 1/433 |

* cited by examiner

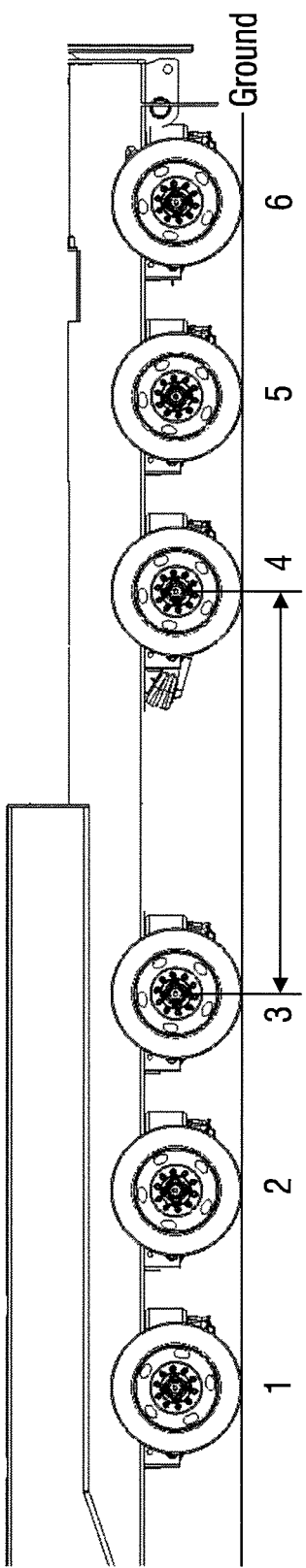
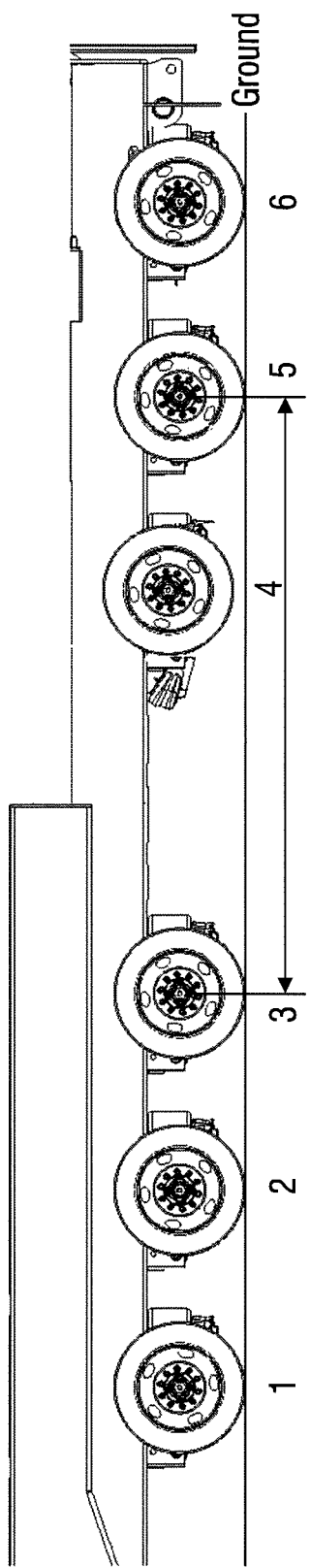
FIG. 2A
FIG. 2B

TRANSPORT TRAILER LOAD BALANCING SUSPENSION AND STEERING SYSTEMS

FIELD

Embodiments disclosed herein relate to transport trailer load balancing suspension and steering systems and related methods of use. Particularly, embodiments disclosed herein relate to (i) a transport trailer having a load balancing air suspension system in which air pressures may be varied within suspension air bags associated with different axles of the transport trailer, (ii) a steering system that automatically straightens wheels on a multi-axle trailer in reverse, and (iii) combinations thereof.

BACKGROUND AND SUMMARY

Coiled tubing and other heavy equipment is generally transported by roadway on multi-axle trailers. Due to greater well depths, coiled tubing lengths needed to complete most well servicing jobs have also increased. Trailer lengths have been extended to offer more axles to allow even more equipment or coiled tubing to be transported to jobsites. By its nature, coiled tubing equipment is heavy and requires specifically designed trailers to transport such heavy loads. However, today's longer transport trailers have encountered highway and roadway weight per axle restrictions and maneuverability, e.g., turning, restrictions. In some circumstances, highway and roadway weight restrictions are such that additional axles, or equipment with additional axles that attaches to either the front or rear of the trailer, must be used to lower the weight per axle. However, additional axles and equipment limit a trailer's turning ability. Certain trailers are designed with axles that "passively" turn in the direction of the tractor pulling the trailer, but the axles can only be straightened manually. What is needed is an improved transport trailer capable of different axle weight configurations and capable of automatically straightening the wheels on one or more axles while in reverse.

Embodiments disclosed herein relate to a multi-axle transport trailer including a plurality of axles, and a suspension comprising air bags associated with each axle, the air bags in communication with an air source, wherein air bags associated with different axles are capable of having different air pressures therein, and a steering system associated with at least one axle, the axle including a tie rod connected between wheels on both ends of the axle, the steering system comprising cylinders configured to articulate the wheels, and a sensing device configured to monitor movement of the tie rod and facilitate actuating the cylinders to turn the wheels.

Other embodiments disclosed herein relate to a method of operating a multi-axle transport trailer in reverse, the trailer comprising suspension air bags in communication with an air source and associated with each axle, and a steering system associated with an axle including a tie rod connected between wheels on both ends of the axle and a control valve configured to operate cylinders to articulate the wheels. The method includes transmitting a signal to the control valve when the trailer is moved in reverse, reducing air pressure within air bags associated with axles having wheels to be articulated, and actuating the cylinders to articulate the wheels in a direction determined by a sensing cylinder coupled to the tie rod.

Yet other embodiments disclosed herein relate to a multi-axle transport trailer comprising a plurality of axles, and air bags associated with each axle, the air bags in communication with an air source, wherein air bags associated with different axles are capable of having different air pressures therein.

Still further embodiments disclosed herein relate to a steering system associated with at least one axle of a multi-axle transport trailer, the axle including a tie rod connected between wheels on both ends of the axle, the steering system including steering cylinders configured to articulate the wheels, a sensing cylinder coupled to the tie rod and configured to monitor movement of the tie rod, a first accumulator in fluid communication with a first end of the sensing cylinder, and a second accumulator in fluid communication with a second end of the sensing cylinder, and a switch configured to monitor pressure within the first and second accumulators, wherein increased pressure within either the first or second accumulator causes the switch to send a signal to actuate the steering cylinders in an appropriate direction to articulate the wheels.

BRIEF DESCRIPTION OF THE DRAWINGS

The invention is illustrated in the accompanying drawings wherein,

FIG. 2A illustrates a side view of an embodiment of a trailer having the load balancing air suspension system of FIG. 1 with all axles on the ground;

FIG. 2B illustrates a side view of an embodiment of a trailer having the load balancing air suspension system of FIG. 1 with one axle raised off the ground;

DETAILED DESCRIPTION

Embodiments disclosed herein relate to a transport trailer having a load balancing air suspension system in which air pressures may be varied or manipulated within suspension air bags associated with different axles of the transport trailer. Air suspension is a type of vehicle suspension powered by an electric or engine-driven air pump or compressor. The compressor pumps air into an air bag, i.e., a flexible bellows, usually made from textile-reinforced rubber or other flexible material. Air is pumped into and inflates the air bag and raises the chassis from the axle. Or air is removed from and deflates the air bag and lowers the chassis toward the axle. Air suspensions are used in place of conventional steel springs in passenger cars, and are commonly used in heavy vehicle applications such as buses, trucks, and semi-trailers.

According to embodiments disclosed herein, air pressure within suspension air bags may be manipulated for different reasons, including to meet state highway and roadway axle weight restrictions or limitations, and to enhance the turning capabilities of larger transport trailers. The transport trailer includes multiple axles along its length. Each axle includes a central shaft fixed to wheels on each end of the axle to rotate the wheels. Tires are mounted on each wheel to provide traction between the trailer and the road while providing a flexible cushion that absorbs shock. Each axle further includes at least one suspension air bag associated at each end of the axle. Each suspension air bag may be a flexible bellows made from textile-reinforced rubber or other flexible material. Each suspension air bag is in communication with an air source and is capable of being inflated or deflated to raise or lower the trailer structure or chassis from the axle.

Figure 1:
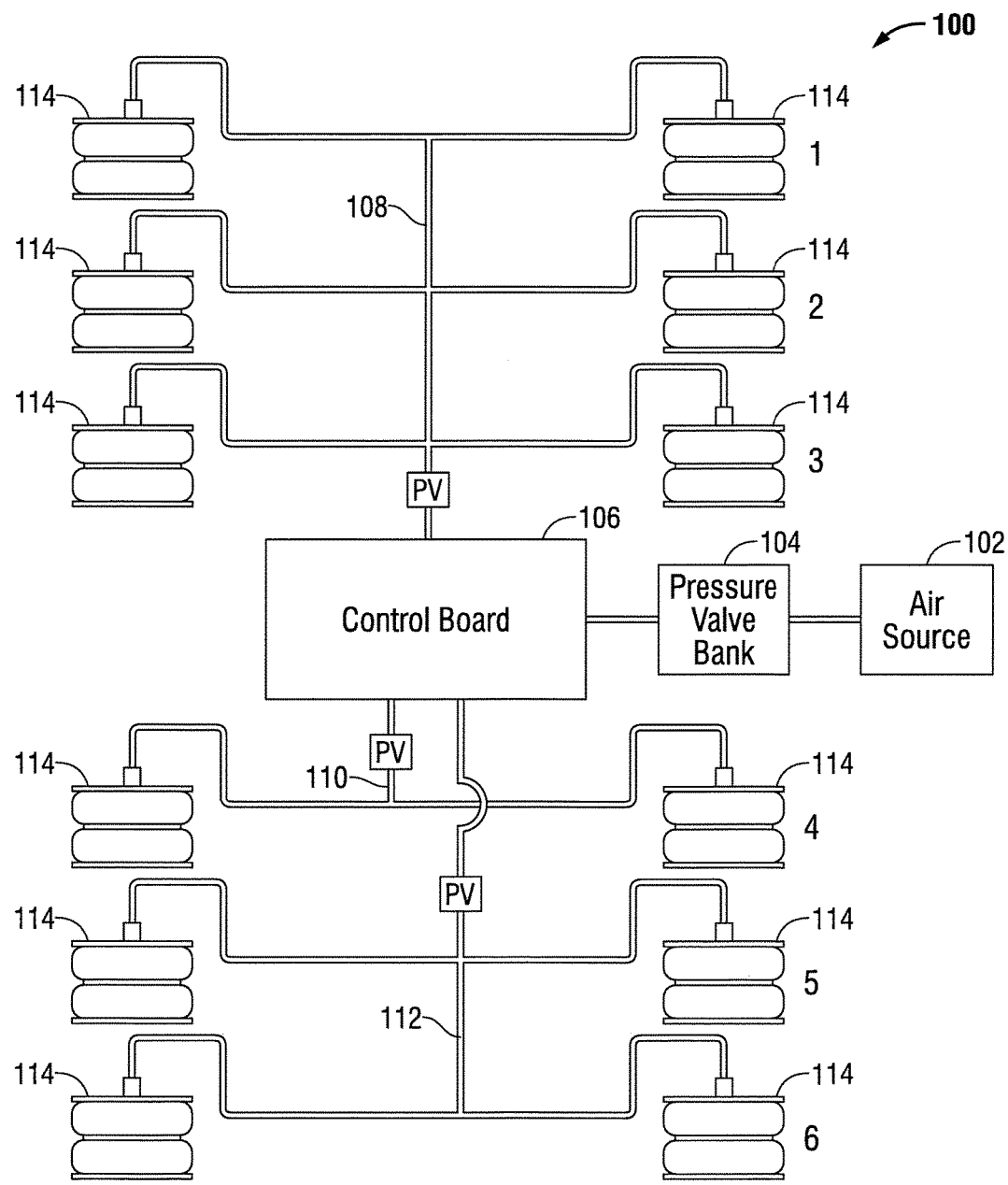
FIG. 1 illustrates a schematic view of an embodiment of load balancing air suspension system incorporated in a multi-axle trailer.

FIG. 1 illustrates a schematic of one embodiment of an air suspension system 100 associated with a multi-axle trailer. For illustrative purposes only, the trailer includes six axles each having a suspension air bag disposed at ends of each axle, however the trailer may have any number of axles. For simplicity, the axles and wheels are not illustrated. An air source 102 may provide air to one or more suspension air bags 1M associated with each axle through one or more air lines. For example, the air source 102 may be truck air or any other compressed air source. As shown, the air source 102 is in communication with suspension air bags 114 associated with axles 1-3 through a first air line 108. The air source 102 is in communication with suspension air bags 114 associated with axle 4 through a second air line 110. The air source 102 is in communication with suspension air bags 114 associated with axles 5 and 6 through a third air line 112. A control board 106 may be included to distribute air from the air source 102 to the one or more air lines and suspension air bags. The control board 106 may be configured as a valve arrangement including automatic and/or manual controls that divert or distribute air to suspension air bags associated with the different axles. A pressure valve bank 104 is configured to control pressure amounts through the different air lines, e.g., 108, 110, 112. The control board 106 distributes the air from one or more pressure valves ("PV") arranged in the pressure valve bank 104. One of ordinary skill in the art will understand that air may arrive at the control board and be routed to air bags at different pressures using various pressure reduction valves, pressure valves, check valves, solenoid valves, master valves and other valves in any arrangement.

Air pressure in the suspension air bags may be manipulated, varied or changed, e.g., increased or decreased, for different trailer axle configurations. FIGS. 2A and 2B illustrate side views of a trailer having a first set of three axles (numbered 1-3) in the front, and a second set of three axles (numbered 4-6) in the rear. FIG. 2A illustrates a side view of an embodiment of a trailer having the load balancing air suspension system of FIG. 1, with substantially equal air pressures in each of the suspension air bags, and accordingly, all axles on the ground. For example, air pressure in each of the suspension air bags may be at least about 50 pounds per square inch ("psi"), or at least about 60 psi, or at least about 70 psi, or at least about 80 psi. In other examples, air pressure in each of the suspension air bags may be greater than 80 psi, or greater than 90 psi, or greater than 100 psi.

Figure 3:
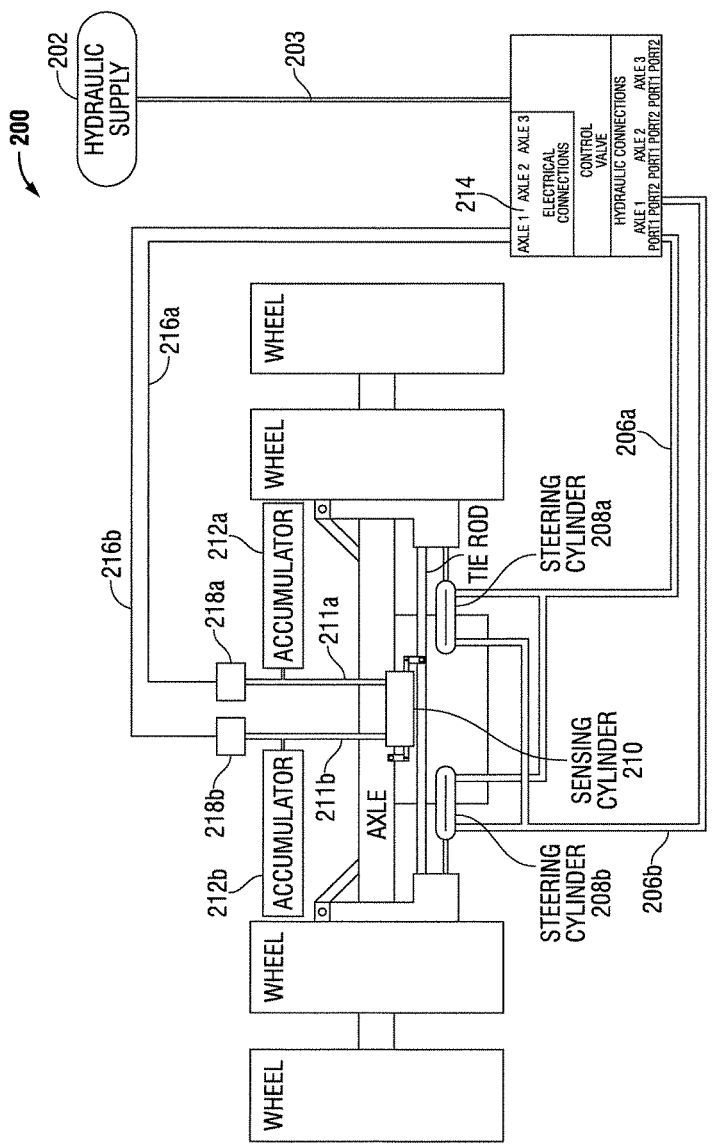
FIG. 3 illustrates a schematic view of an embodiment of a steering system incorporated in a multi-axle trailer.

FIG. 2B illustrates a side view of an embodiment of a trailer having the load balancing air suspension system of FIG. 1, with unequal air pressures in each of the suspension air bags, and accordingly, with one axle (the 4th axle) raised off the ground, which distributes the total load over the remaining axles still on the ground. In FIG. 3, air pressure in suspension air bags associated with the raised 4th axle may be about zero, or a negligible amount, while air pressure in one or more of the remaining air bags associated with axles still on the ground may be increased. Moreover, air pressure in suspension air bags associated with axles 5 and 6 may be greater than air pressure in suspension air bags associated with axles 1-3, when the 4th axle is raised. For example, air pressure in air bags associated with axles 5 and 6 may be at least about 70 psi, or greater than 80 psi, or greater than 90 psi, or greater than 100 psi. Air pressure in air bags associated with axles 1-3 may be less than 70 psi, or less than 60 psi, or less than 50 psi, or less than 40 psi.

FIGS. 2A and 2B further illustrate a distance "A" between the rearmost axle of the front set of three axles 1-3 on the ground and the front most axle of the rear set of three axles 4-6 on the ground. In FIG. 2A, distance A is measured between axle 3 and axle 4. In FIG. 2B, distance A is measured between axle 3 and axle 5. As illustrated, distance A is greater in FIG. 2B when the 4th axle is raised than in FIG. 2A. Accordingly, the multi-axle trailer is configurable for various highway and roadway weight per axle restrictions and spacing requirements to allow more equipment to be transported between different jobsites.

Embodiments disclosed herein further relate to a steering system that, during reverse movement of a multi-axle trailer, automatically straightens the wheels. FIG. 3 illustrates a schematic view of an embodiment of a steering system on one axle of a multi-axle trailer. The illustrated steering system may be disposed on any and multiple axles of a multi-axle trailer. One or more wheels may be disposed on both ends of a steering axle extending lengthwise across the trailer. A rigid linkage, also known as a tie rod, is attached or coupled between the wheels on both ends of the steering axle. The tie rod is part of the steering mechanism and provides a mechanical structure rigidly linking the wheels on both ends of the steering axle and turning the wheels together.

The steering system 200 includes a multi-circuit hydraulic control valve 204, which receives hydraulic fluid from a hydraulic supply 202 through line 203. The hydraulic supply 202 may be stored on the trailer or another location. The control valve 204 is a valve arrangement that distributes pressurized hydraulic fluid through hydraulic lines 206a (e.g., from "Port 1") and 206b (e.g., from "Port 2") to respective steering cylinders 208a, 208b. Steering cylinders 208a, 208b are associated with at least one wheel on both axle ends. The steering cylinders may be hydraulic or pneumatic and any type of commercially available cylinder. The steering cylinders 208a, 208b may be coupled to the tie rod in a manner that allows the steering cylinders to push and pull on the tie rod of the steering axle, articulating, i.e., turning, the wheels. As shown, hydraulic line 206a is in fluid communication with a first side of each respective steering cylinder so that hydraulic pressure in line 206a causes both steering cylinders to move the wheels in the same (a first) direction. Moreover, hydraulic line 206b is in fluid communication with a second side of each respective steering cylinder so that hydraulic pressure in line 206b causes both steering cylinders to move the wheels in the same (a second direction).

A sensing device may monitor movement of the tie rod. In one embodiment, a "passive" sensing cylinder 210 may be coupled to the tie rod. As used herein, the sensing cylinder is characterized as being passive because the sensing cylinder does not exert force on the tie rod to which it is coupled. Rather, the tie rod exerts force on the sensing cylinder causing an internal piston within the sensing cylinder to move in one direction or another. The sensing cylinder may be any type of commercially available cylinder. Each end of the sensing cylinder 210 has a fluid line 211a, 211b that is associated with a respective accumulator 212a, 212b. The accumulators may be any type of commercially available accumulator. As the tie rod moves with the wheels and the piston within the sensing cylinder 210 is moved, one of the accumulators, depending on the direction the wheels are turned, is pressurized. Pressure switches 218a, 218b are associated with each respective accumulators and configured to sense pressure in the respective accumulators induced by movement of the piston within the sensing cylinder 210. Pressure switches may be any type of commercially available pressure switch. Accordingly, pressure switches send signals (e.g., 12 or 24 volt) through electrical circuits 216a, 216b to the multi-circuit hydraulic control valve 204 via electrical connection 214, which causes the hydraulic control valve to adjust the hydraulic fluid pressure through appropriate hydraulic line 206a, 206b to the steering cylinders.

Figure 4:
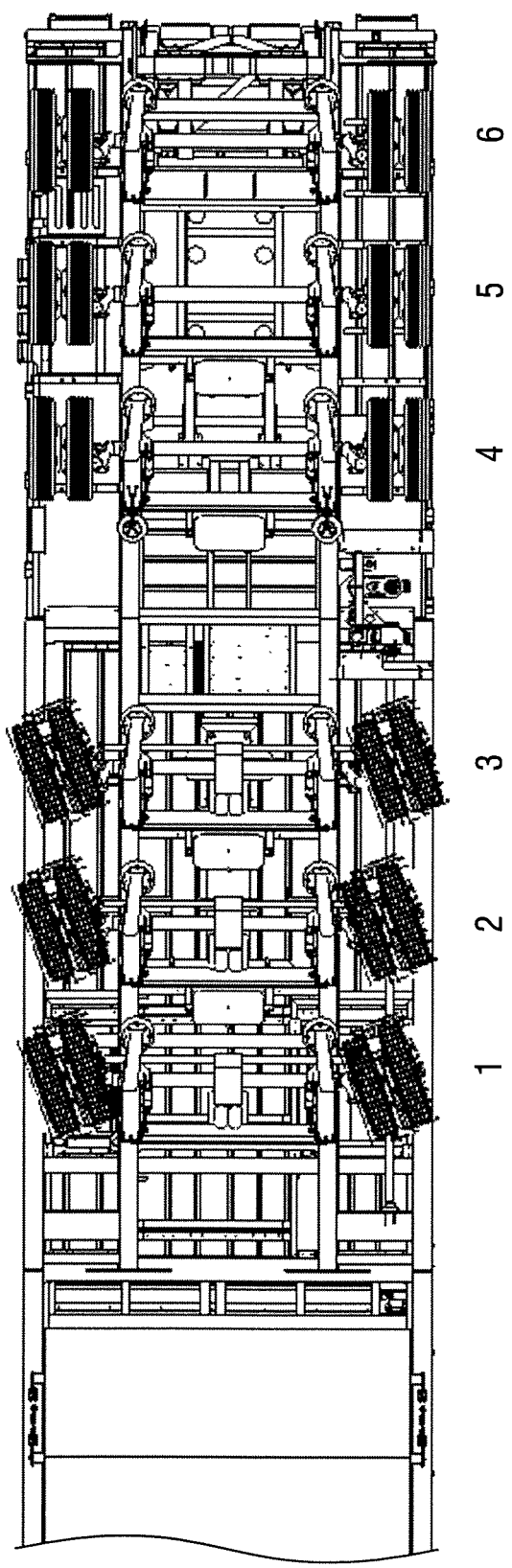
FIG. 4 illustrates a top view of an embodiment of a turning trailer having the load balancing air suspension system of FIG. 1 and the steering system of FIG. 3 incorporated therein.

FIG. 4 illustrates a top view of a turning trailer having the steering system of FIG. 3 incorporated therein. The trailer includes a front set of three steerable axles 1-3 and a rear set of fixed or non-steerable axles 4-6. The steering system of FIG. 3 may be associated with each of the steerable axles. In forward transport and during a forward turn of the trailer, the steering cylinders 208a, 208b on each steerable axle are allowed to "float" from side to side. That is, the steering cylinders do not exert force on the tie rod to maintain the wheels on steerable axles in a certain position. The piston within the sensing cylinder 210 is forced in either direction depending on the direction of the turn, and accordingly, pressure is built on the side of the piston within the sensing cylinder 210 that is compressed. Consequently, pressure is increased in the accumulator on the side of the piston that is compressed, and decreased in the other accumulator. Increased pressure in an accumulator is detected by the respective pressure switch.

The steering system is activated when the truck and trailer are moved in reverse, i.e., opposite forward movement of the truck and trailer. In one embodiment, the steering system is activated when the truck and trailer are put into reverse, and accordingly, power is received at the reverse light circuit. Both pressure switches send a signal to the control valve 204 only when the trailer is moved in reverse. Put otherwise, in forward turning movement of the trailer during which pressure is built in one of the accumulators and detected by the respective pressure switch, the activated pressure switch will not send a signal to the hydraulic control valve 204 because the steering system is not activated during forward movement. If the truck and trailer were to start reversing its direction, the activated pressure switch only then sends a signal to the multi-circuit control valve 204 to operate the steering cylinders, thereby forcing the wheels to straighten. Upon receiving a signal from the pressure switch upon actuation of the reverse lamps, the multi-circuit hydraulic valve 204 switches position to straighten the wheels and hold the wheels substantially straight during reverse movements. This system ensures that the wheels and suspension not only operate within mechanical guidelines but automatically adjust to forward and reverse operations without manually adjusting the steering to straight for reverse movement. As long as the towing truck is in reverse, then the steering system is activated.

The steering system also works in conjunction with the load balancing air suspension system illustrated in FIG. 1 during reverse movement. When the steering system is activated, the same 12 volt signal may activate the controlling pneumatic valves that manipulate air pressure in air bags of the air suspension. The load balancing air suspension system may decrease air pressure in the front three air bags associated with steerable axles, and increase air pressure in the rear three air bags associated with the rear three axles to aid in front axle steering. Varying air pressure using the load balancing air suspension allows the entire load to be carried by all six axles but reduces the force that the steering cylinders must oppose on the steerable axles.

Advantageously, the air bag suspension system disclosed herein allows air pressure to be distributed at different pressures to air bags associated with different axles to fit weight ratios and provide different weight configurations along a length of the trailer. Further, the steering system is capable of automatically straightening the wheels on one or more axles while in reverse.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims

What is claimed is:
1. A multi-axle transport trailer comprising:
   a plurality of axles, and a suspension system comprising air bags configured to be inflated to raise or deflated to lower at least one axle, wherein the air bags are in communication with an air source;
   a steering system associated with at least one axle, the axle including a tie rod connected between wheels on both ends of the axle, the steering system comprising cylinders configured to articulate the wheels,
   a sensing device coupled to the tie rod and configured to monitor movement of the tie rod and facilitate actuating the cylinders to turn the wheels;
   a first accumulator in fluid communication with a first end of the sensing device, and a second accumulator in fluid communication with a second end of the sensing device; and
   a switch configured to monitor pressure within the first and second accumulators, wherein increased pressure within either the first or second accumulator causes the switch to send a signal to actuate the steering cylinders in an appropriate direction to straighten the wheels.

2. The multi-axle trailer of claim 1, wherein the switch sends the signal only when the trailer is moved in reverse.

3. The multi-axle trailer of claim 1, further comprising separate air lines from the air source to air bags of axles having different air pressures therein.

4. The multi-axle trailer of claim 1, wherein air pressure is reduced within air bags coupled with axles having wheels to be articulated prior to articulating the wheels.

5. A multi-axle transport trailer comprising a plurality of axles, and air bags coupled with each axle, the air bags in communication with an air source, wherein air bags coupled with different axles are capable of having different air pressures therein;
   a tie rod connected between wheels on both ends of at least one axle,
   steering cylinders configured to articulate the wheels on ends of the at least one axle;
   a sensing cylinder coupled to the tie rod and configured to monitor movement of the tie rod;
   a first accumulator in fluid communication with a first end of the sensing cylinder, and a second accumulator in fluid communication with a second end of the sensing cylinder; and
   a switch configured to monitor pressure within the first and second accumulators, wherein increased pressure within either the first or second accumulator causes the switch to send a signal to actuate the steering cylinders in an appropriate direction to articulate the wheels.

6. The multi-axle trailer of claim 5, further comprising separate air lines from the air source to air bags of axles having different air pressures therein.

* * * * *